(12) United States Patent
Watson et al.

(10) Patent No.: US 12,429,628 B2
(45) Date of Patent: Sep. 30, 2025

(54) FRACTIONAL ICE COVER PREDICTIONS WITH MACHINE LEARNING, SATELLITE, THERMODYNAMICS, AND IN-SITU OBSERVATIONS

(71) Applicant: INTERNATIONAL BUSINESS MACHINES CORPORATION, Armonk, NY (US)

(72) Inventors: Campbell D. Watson, Brooklyn, NY (US); Guillaume A. R. Auger, White Plains, NY (US); Eli Michael Dow, Pleasant Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/108,986

(22) Filed: Dec. 1, 2020

(65) Prior Publication Data

US 2022/0171093 A1 Jun. 2, 2022

(51) Int. Cl.
*G01W 1/10* (2006.01)
*B25J 9/16* (2006.01)
*G06N 5/01* (2023.01)
*G06N 20/00* (2019.01)

(52) U.S. Cl.
CPC ............. *G01W 1/10* (2013.01); *B25J 9/1664* (2013.01); *G06N 5/01* (2023.01); *G06N 20/00* (2019.01)

(58) Field of Classification Search
CPC ......... G01W 1/10; G06N 20/00; G06N 5/003; B25J 9/1664
See application file for complete search history.

(56) References Cited

U.S. PATENT DOCUMENTS

| | | | | |
|---|---|---|---|---|
| 10,168,448 | B2* | 1/2019 | Hamann | G01W 1/10 |
| 10,386,541 | B2* | 8/2019 | Hamann | G01W 1/10 |
| 10,762,422 | B2 | 9/2020 | Shaked | |
| 2011/0291862 | A1* | 12/2011 | Broman | B63C 11/42 |
| | | | | 340/984 |

(Continued)

FOREIGN PATENT DOCUMENTS

| | | |
|---|---|---|
| CN | 104198052 A | 12/2014 |
| CN | 108375808 A | 8/2018 |

(Continued)

OTHER PUBLICATIONS

Kim, J. et al., "Satellite-Based Prediction of Arctic Sea Ice Concentration Using a Deep Neural Network with Multi-Model Ensemble"; Remote Sensing (2019); vol. 11:19; 20 pgs.

Kim, Y. et al., "Prediction of Monthly Arctic Sea Ice Concentration using Satellite and Reanalysis Data Based on Convolutional Neural Networks"; The Cryosphere (2019); 29 pgs.

(Continued)

*Primary Examiner* — Raymond L Nimox
(74) *Attorney, Agent, or Firm* — CHIP LAW GROUP (57) ABSTRACT

A computer implemented method of predicting ice coverage on a body of water includes generating a first ice cover prediction with a thermodynamics module and generating a second ice cover prediction with a machine learning module. The first ice cover prediction is combined with the second ice cover prediction to generate a combined ice cover prediction. Error statistics are computed based on a comparison of the combined ice cover prediction with an ice coverage observation and the combined ice cover prediction is updated based on the error statistics.

25 Claims, 6 Drawing Sheets

(56) References Cited

U.S. PATENT DOCUMENTS

| | | | | |
|---|---|---|---|---|
| 2013/0099960 A1* | 4/2013 | Broman | G01S 13/862 | 342/52 |
| 2014/0324352 A1* | 10/2014 | Hamann | G01W 1/10 | 702/3 |
| 2016/0167755 A1* | 6/2016 | Soofi | B63G 8/001 | 701/21 |
| 2018/0252842 A1* | 9/2018 | Arandia | G01W 1/10 | |
| 2019/0228362 A1* | 7/2019 | Anagnostou | G06N 20/00 | |
| 2020/0208979 A1* | 7/2020 | Pandey | G01C 21/005 | |
| 2020/0309993 A1* | 10/2020 | Ganshin | G06N 3/0454 | |
| 2020/0348448 A1* | 11/2020 | Tocornal | G06N 3/08 | |
| 2020/0356839 A1* | 11/2020 | Tocornal | G06K 9/6262 | |
| 2020/0372349 A1* | 11/2020 | Gaitan Ospina | G06N 3/0445 | |
| 2020/0372359 A1 | 11/2020 | Shaked et al. | | |

FOREIGN PATENT DOCUMENTS

| | | |
|---|---|---|
| CN | 109117883 A | 1/2019 |
| CN | 109196527 A | 1/2019 |
| CN | 109829569 A | 5/2019 |
| CN | 111539842 A | 8/2020 |
| CN | 114582440 A | 6/2022 |
| EP | 3330747 B1 | 8/2019 |
| JP | 2019-087244 A | 6/2019 |
| JP | 2022-087837 A | 6/2022 |
| KR | 101603718 B1 | 3/2016 |
| KR | 101645468 B1 | 8/2016 |
| WO | 2013/009245 A1 | 1/2013 |

OTHER PUBLICATIONS

Smith, G. C. et al., "Sea Ice Forecast Verification in the Canadian Global Ice Ocean Prediction System"; Q. J. R. . Meterol. Soc. (2016); vol. 142; pp. 659-671/.

Armour, S. "Artificial Intelligence Helps Experts Forecast Icebergs"; Phys Org (2020); 3 pgs.

Fritzner, S. et al., "Impact of Assimilating Sea Ice Concentration, Sea Ice Thickness and Snow Depth in a Coupled Ocean-Sea Ice Modelling System"; The Cryosphere (2019); vol. 13; pp. 491-509.

Stark, J. D. et al., "Sea Ice Concentration and Motion Assimilation in a Sea Ice-Ocean Model"; J. of Geo Phys Res. (2008); vol. 113; 19 pgs.

Anonymous, "Ice Drift Tracking Using Photogrammetric Methods on Radar"; IP.com; IPCOM000248020D; Oct. 18, 2016; 7 pgs.

Anonymous, "A Method for Improved Sea Ice and Iceberg Tracking in Marine Radar"; IP.com; PCOM000224952D; Jan. 15, 2013; 7 pgs.

Chen, B. et al., "Runway temperature prediction based on LSTM multivariate time series-mechanism under ice and snow", Online Lunch Time (2022), https://kns.cnki.net/kcms/detail/11.2625.V, 17 pgs. English Abstract.

Chinese Office Action with English translation, issued Jul. 10, 2024 in counterpart CN Application No. 202111433899.2, 13 pgs.

The State Intellectual Property Office of People's Republic of China, "Notification of Grant," Oct. 24, 2024, 2 Pages, CN Application No. 202111433899.2.

Japan Patent Office, "Decision to Grant a Patent" Mar. 11, 2025, 05 Pages, JP Application No. 2021-194703.

* cited by examiner

FRACTIONAL ICE COVER PREDICTIONS WITH MACHINE LEARNING, SATELLITE, THERMODYNAMICS, AND IN-SITU OBSERVATIONS

BACKGROUND

Technical Field

The present disclosure generally relates to artificial intelligence and machine learning systems, and more particularly, to methods and systems for predicting fractional ice cover on a body of water.

Description of the Related Art

Many lakes and parts of the ocean freeze over in the winter. Ice acts as a buffer between the atmosphere and the water, impacting the flux of heat and momentum, the exchange of gases, and the penetration of light. This has a profound impact on the movement of water and nutrients and its biological evolution. Reliable predictions of ice cover can ensure a more accurate simulation of the hydrodynamics, along with the nutrients, chemistry, and biology during the ice-covered months.

However, ice cover is often partial, i.e., a fraction of the water body is covered with ice and the remainder is open water. Partial ice cover can exist for days, weeks, or even months, with the ice cover expanding and contracting as the weather changes. During such periods, some parts of the water body are exposed to the atmosphere while other parts of the water body have this ice cover buffer. This has both local effects on the water circulation and more general effects if partial ice cover exists for many days.

Currently, a hydrodynamic model is used to simulate the movement of water. To accurately simulate hydrodynamics during extended periods of partial ice cover, the hydrodynamics model needs knowledge of the spatial extent of ice cover.

SUMMARY

According to various embodiments, a computing device, a non-transitory computer readable storage medium, and a method are provided for making predictions with machine learning to determine a fractional ice cover using at least one of satellite data, thermodynamics, and an in-situ observing system.

In one embodiment, a computer implemented method of predicting ice coverage on a body of water includes generating a first ice cover prediction with a thermodynamics module and generating a second ice cover prediction with a machine learning module. The first ice cover prediction is combined with the second ice cover prediction to generate a combined ice cover prediction. Error statistics are computed based on a comparison of the combined ice cover prediction with an ice coverage observation and the combined ice cover prediction is updated based on the error statistics.

In some embodiments, the thermodynamics module includes a hydrodynamic model and thermodynamic equations used to generate the first ice cover prediction. In some embodiments, the ice coverage in the hydrodynamic model is updated based on the error statistics.

In some embodiments, the machine learning module include a trained model and a module for generating a predicted local weather condition. In some embodiments, a feedback loop is provided to the trained model based on the error statistics.

In some embodiments, the method further includes applying weightings and thresholds to the first ice coverage prediction and the second ice coverage prediction to generate the combined ice coverage prediction. In some embodiments, the weightings and thresholds are applied to each grid cell defining a surface area of the body of water. In some embodiments, the weighting and thresholds for each grid cell are defined separately based on a predefined period throughout a year.

In some embodiments, a tree-based model is used to optimize the combined ice coverage prediction.

In some embodiments, the method further includes performing direct observations of ice coverage at the body of water with an observation device. In some embodiments, a travel path for the observation device is optimized based on the combined ice coverage prediction and observations of whether ice is present at a grid cell defining a surface area of the body of water. In some embodiments, the observation device is an in-situ automated observation device. According to various embodiments, a computer implemented method for predicting ice coverage on a body of water includes generating a first ice cover prediction with a thermodynamics module and generating a second ice cover prediction with a machine learning module. The first ice cover prediction is combined with the second ice cover prediction to generate a combined ice cover prediction based on an initial set of weightings and thresholds. Error statistics are computed based on a comparison of the combined ice cover prediction with an ice coverage observation from an automated observation device and the weightings and thresholds are updated based on the error statistics. An updated combined ice cover prediction is generated using the updated weightings and thresholds.

By virtue of the concepts discussed herein, a system and method are provided that improves upon the approaches currently used to determine fractional ice cover. The system and methods discussed herein can improve the accuracy of fractional ice cover prediction, including the prediction of the expansion and contraction of the fractional ice cover. As discussed below, the system and methods can further improve upon predictions through the use of an in-situ observing system, thus affirming the predictions from the models and including the possibility of improving upon the models themselves.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

DETAILED DESCRIPTION

In the following detailed description, numerous specific details are set forth by way of examples to provide a thorough understanding of the relevant teachings. However, it should be apparent that the present teachings may be practiced without such details. In other instances, well-known methods, procedures, components, and/or circuitry have been described at a relatively high-level, without detail, to avoid unnecessarily obscuring aspects of the present teachings.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

As discussed in greater detail below, the present disclosure generally relates to systems for predicting ice cover for a body of water by using a mixed model approach that utilizes both a physics-based model and a machine learning model to predict realistic ice cover. The machine learning model can be reinforced by observations. The model can include feedbacks, as described in greater detail below, to improve the predictions over time. The present disclosure further relates to methods to simulate hydrodynamics during periods of ice cover by combining predictions from a machine learning model trained on satellite-derived ice cover concentration with predictions from a thermodynamics-based ice model driven by the hydrodynamics model to determine the ice concentration and flag grid cells in the hydrodynamics as having ice cover.

There are existing methods to predict ice concentration using satellite observations and weather data using machine learning. Further, there are existing methods to predict ice formation in a hydrodynamic model via the numerical discretization of the water thermodynamics using differential equations. The methods and system of the present invention combines both machine learning and hydrodynamic models and uses optimized feedback, as discussed below, to improve simulations with a hydrodynamics model.

Reference now is made in detail to the details illustrated in the accompanying drawings and discussed below.

Figure 1:
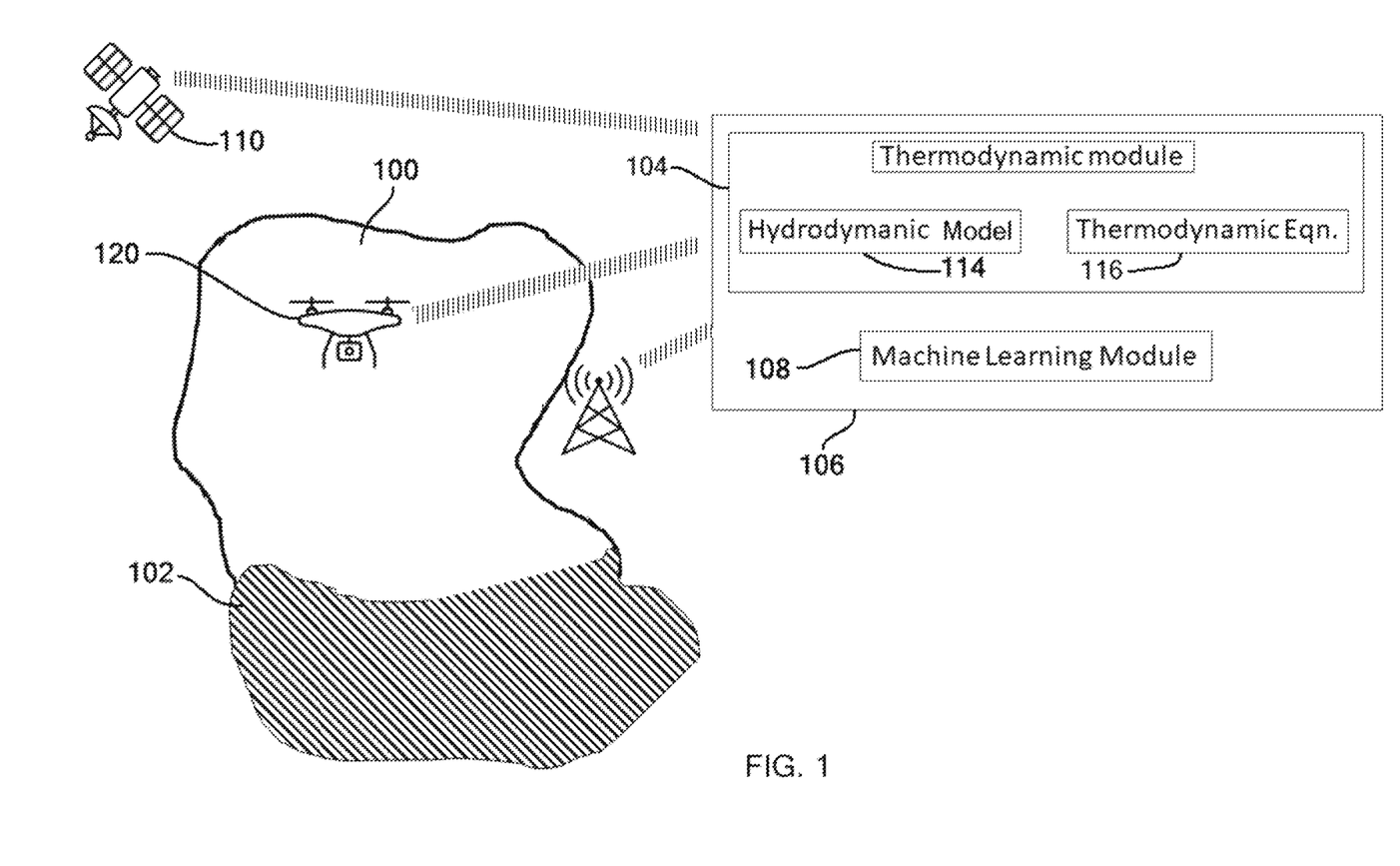
FIG. 1 is a representation of various components used in a system to predict ice cover on a body of water, according to an embodiment of the present disclosure.
Figure 2:
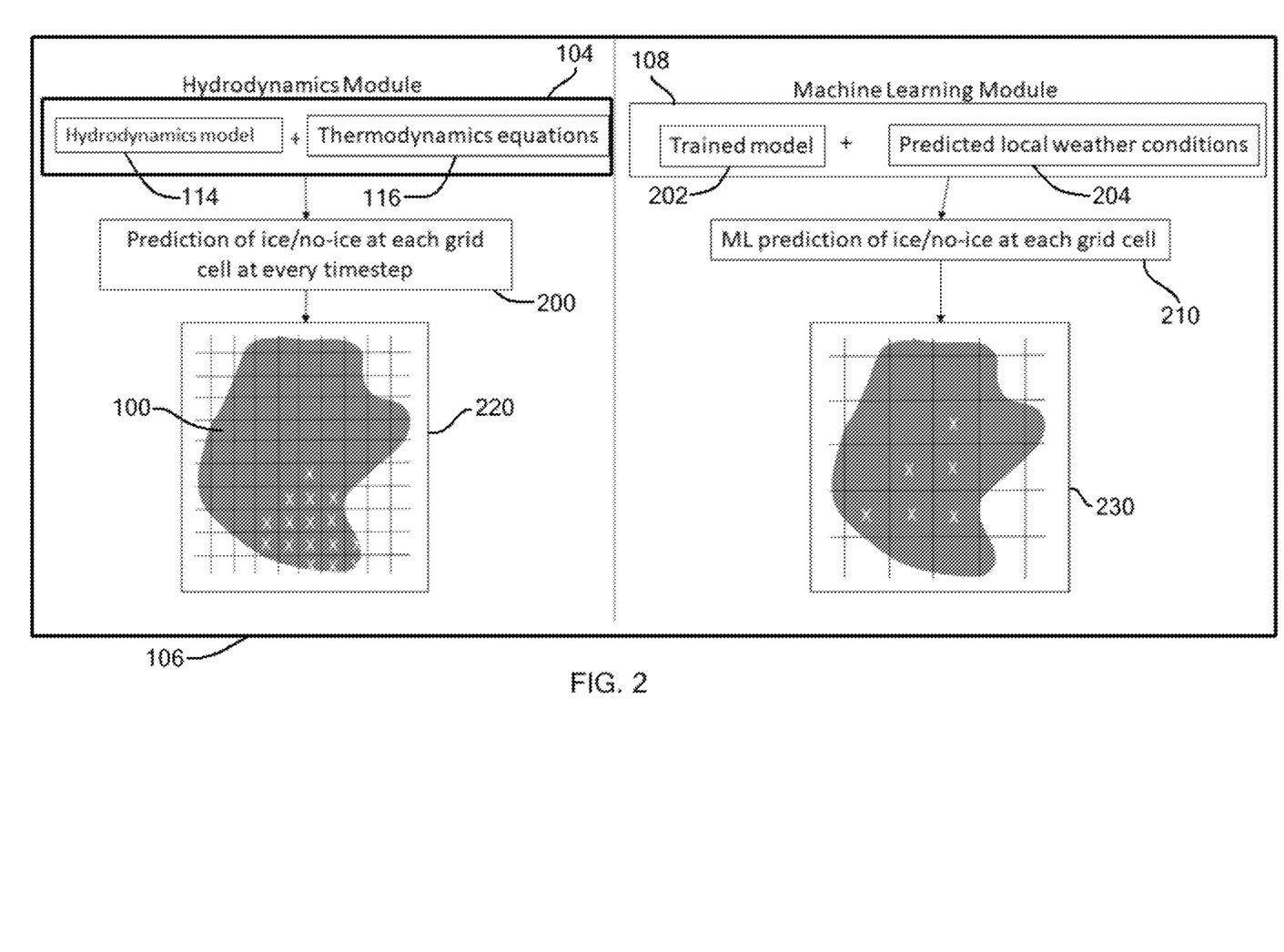
FIG. 2 is a pictorial representation of a body of water divided into grids, where indication of ice cover is predicted with a combined hydrodynamics model and machine learning model.

Referring to FIGS. 1 and 2, a body of water 100 can include ice cover 102, indicated by slashed lines on the body of water 100. A thermodynamics module 104 of an ice prediction engine 106 can receive weather data from weather stations 112 and can use this data in a hydrodynamics model 114, along with thermodynamic equations 116, to make an ice cover prediction. A machine learning module 108 can use satellite data from a satellite 110 to correlate between observed ice concentrations and the local climate to make predictions of future ice cover. The thermodynamics module 104 can perform computations up to every timestep of the hydrodynamic model 114, such as every three seconds, resulting in a high temporal resolution of the thermodynamics module 104. Information for the ice cover prediction can be made at a high spatial resolution.

The machine learning module 108 can use correlations between observed ice concentrations and the local climate to make predictions. The computations of the machine learning module 108 can be made when new weather information is available and may be gated by choice of feature values used in training of the model, such as with an average daily temperature. In some embodiments, the trained model 202 of the machine learning module 108 can generate predicted local weather conditions 204 to generate the ice coverage prediction 230.

Figure 3:
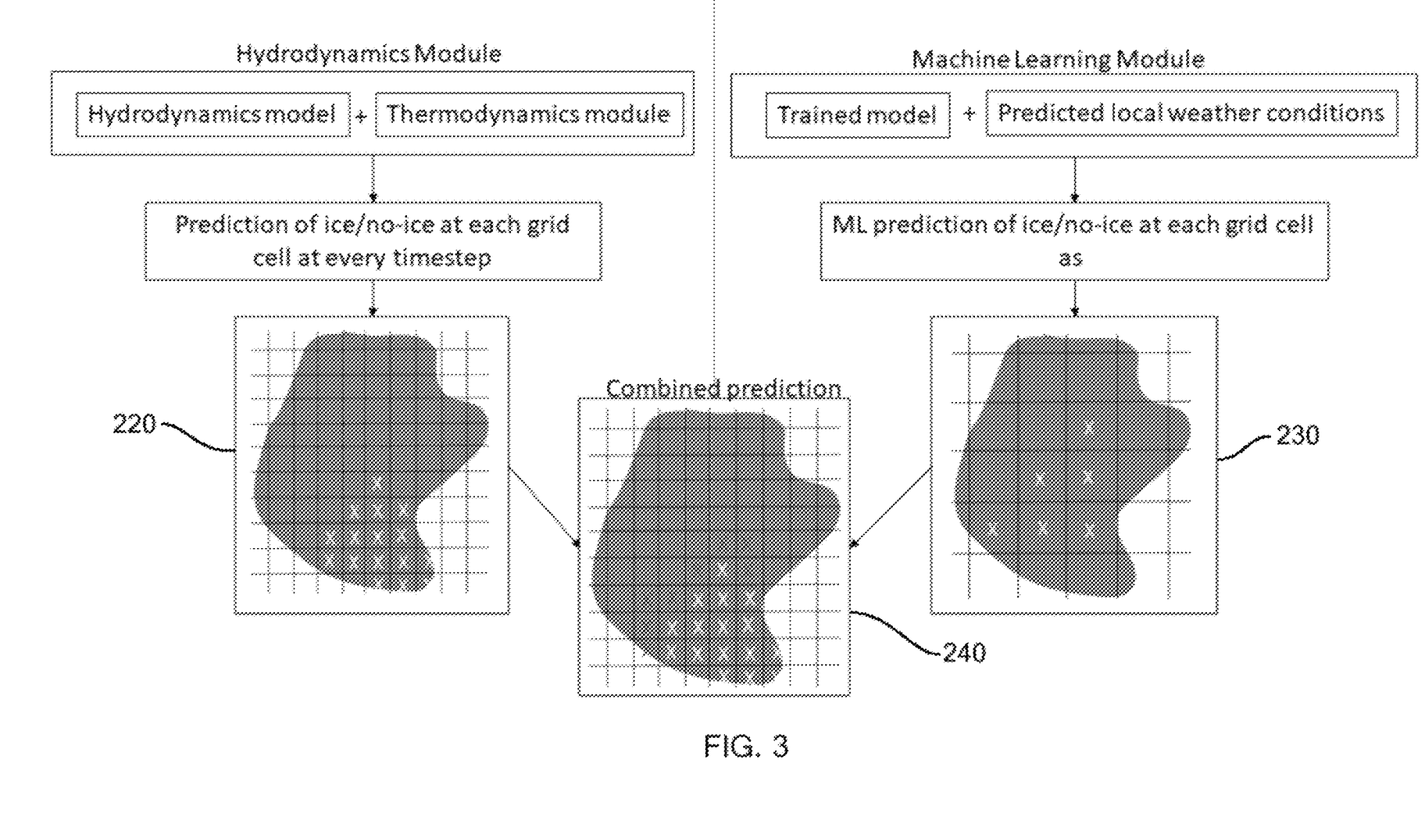
FIG. 3 is a pictorial representation illustrating how the hydrodynamics model and machine learning model of FIG. 2 are combined to generate a combined prediction, consistent with an illustrative embodiment.

Referring now to FIGS. 2 and 3, the ice prediction engine 106 can generate ice cover predictions 220, 230 for each of the hydrodynamics module 104 and the machine learning module 108. These ice cover predictions 220, 230 can be combined, as discussed in greater detail below, to generate a combined prediction 240. The combined prediction 240 can illustrate ice coverage, indicated by x-notated grid portions, on the body of water 100.

Figure 4:
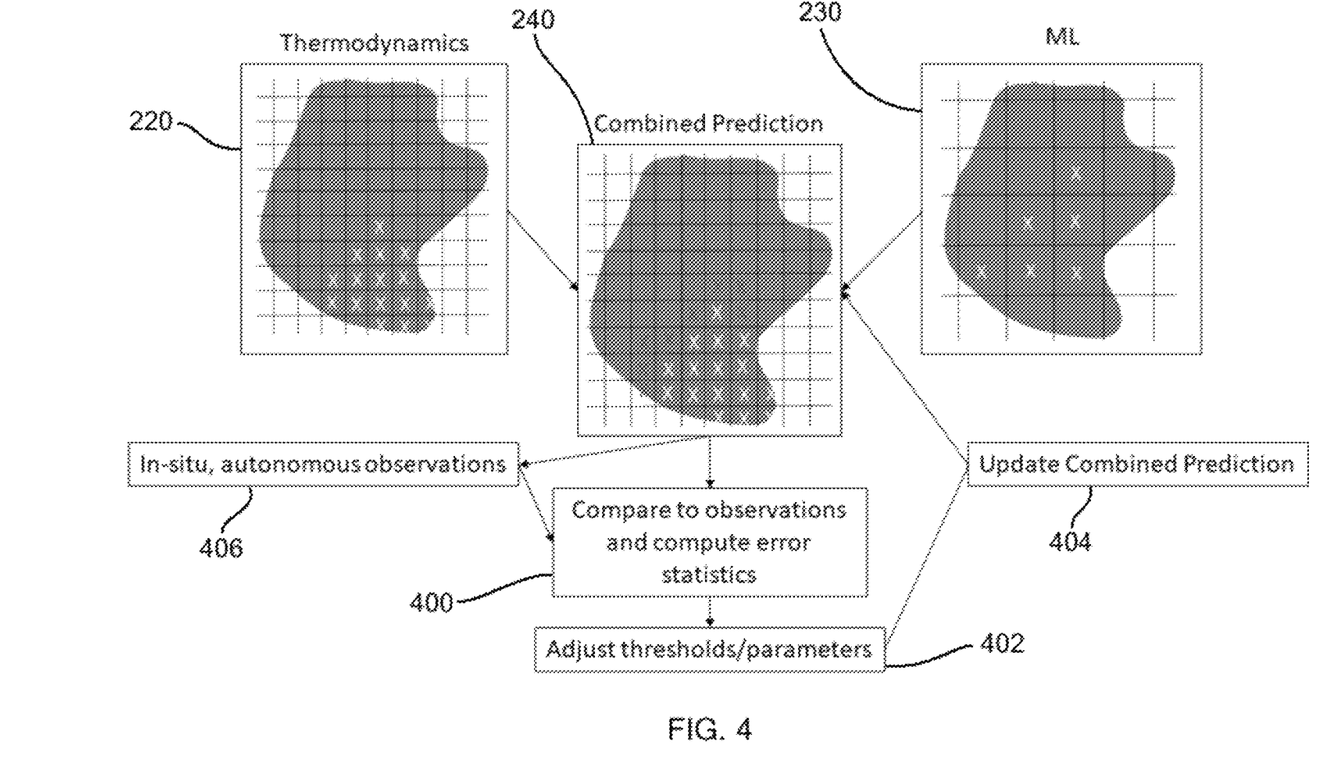
FIG. 4 is a pictorial representation showing the combined prediction of FIG. 3 and further illustrating how in-situ, autonomous observations can be used to update the combined prediction, consistent with an illustrative embodiment.

Referring to FIG. 4, the combined prediction 240 can be compared to observations made regarding actual ice cover and error statistics can be calculated in act 400. The thresholds and parameters, as described below, used to generate the combined prediction 240 from the predictions 220, 230 from the thermodynamic module 104 and the machine learning module 108 (see FIG. 3) can be adjusted in act 402 based on the computed error statistics. The combined prediction 240 can be updated at act 404.

In some embodiments, an in-situ autonomous observation device 120 (see FIG. 1, also referred to as observation device 120) can be used to observe actual ice cover at act 406 and such observations may be used in act 400 to compare these observations with the combined prediction 240 to compute the error statistics.

The observation device 120 can be used to complement remotely sensed data, such as that from the satellites 110. The observation device 120 can take various forms, such as an underwater vehicle (UAV), a surface floating device, such as a floating dock, an air vehicle, such as a drone, snowmobile, amphibious vehicle, or the like. The observation device 120 can be equipped with sensors to detect the presence of ice coverage at any given location. In some embodiments, the observation device 120 can be optimized to explore areas based on the combined prediction 240, where the areas that border the ice coverage can be explored selectively, which can be advantageous for larger bodies of water where exploration of the entire body of water may not be practical or obtainable in a given period of time. In some embodiments, the observation device 120 may be include machine learning algorithms providing the ability to use weather data along with the combined prediction 240 to determine a desired search space.

Figure 5:
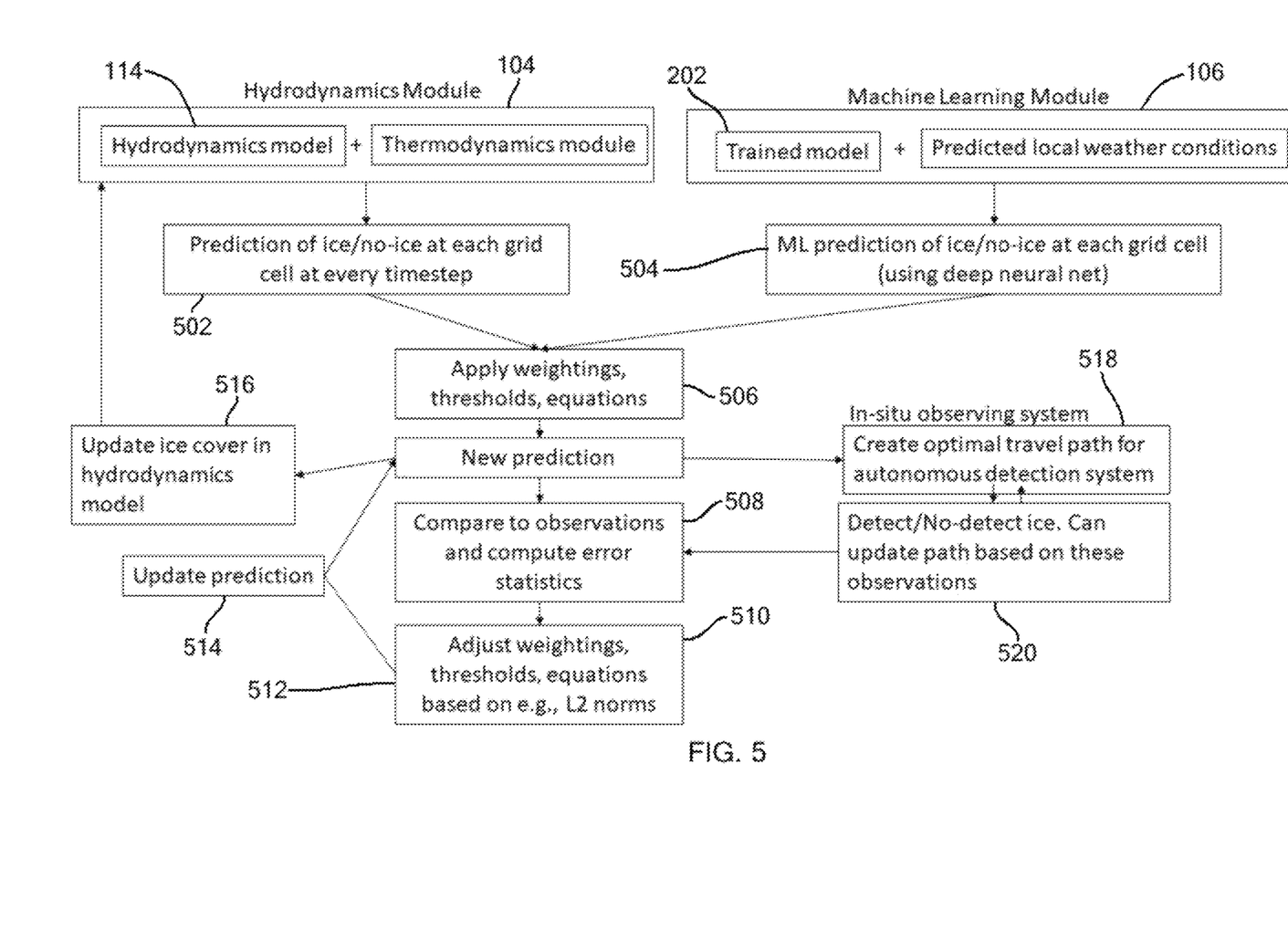
FIG. 5 is a flow chart illustrating acts involved with making and updating an ice cover prediction, consistent with an illustrative embodiment.

With the foregoing overview of the example ice prediction engine 106 (see FIG. 2), it may be helpful now to consider a high-level discussion of an example process. To that end, FIG. 5 presents an illustrative process related to the generation of an ice cover prediction through both a thermodynamic module and a machine learning module. Process 500 is illustrated as a collection of blocks, in a logical flowchart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. In each process, the order in which the operations are described is not intended to be construed as a limitation, and any number of the described blocks can be combined in any order and/or performed in parallel to implement the process. For discussion purposes, the process 500 is described with reference to the ice prediction engine 106 of FIG. 2.

Referring to FIG. 5, the process 500 for predicting ice coverage of a body of water can use the thermodynamic module 104 to generate a prediction of ice/no-ice at each grid cell at every timestop at act 502. The process 500 can use the machine learning module 106 to generate a prediction of ice/no-ice at each grid cell using, for example, a deep neural net, at act 504.

At act 506, weightings and thresholds can be applied to combine the predictions of acts 502 and 504 to generate a combined prediction at act 508. The problem of applying weights and thresholds at act 506 can be suited to a tree-based model (such as random forest, XGBoost, or the like) to optimize the prediction, although other algorithmic approaches could also be used. Random weightings and thresholds may be selected to provide a first prediction. The tree-based model can be trained using observations, adjusting weightings and thresholds for each grid cell based on error statistics at act 510. The weightings and thresholds can be adjusted at act 512 based on, for example, L2 norms to update the prediction at act 514. In some embodiments, hyperparameter tuning of the tree based model (e.g., adjusting the number of branches) can be performed for optimized performance of the tree-based model for adjusting the weightings and thresholds at act 512. The adjusted weightings and thresholds can be defined for a given grid cell of the surface area of the body of water, such as the grid cells shown in the combined ice coverage prediction 240 in FIG. 3. Subsequent training can occur as more observations become available. In some embodiments, the weightings and thresholds for a given grid cell may be defined for a given time of year, where different weightings and thresholds may be provided, as an example, for each month, as the prediction skill of ice cover from the hydrodynamics model and satellite-based machine learning models may differ seasonally.

When the combined prediction is generated (at acts 506 and 508) or updated (at act 514), the updated ice cover prediction can be fed back to the thermodynamics module 104 at act 516 to be used in the hydrodynamics model 114. In some embodiments, based on the error statistics determined at act 510, the ice prediction engine 106 (see FIG. 2) update the trained model of the machine learning module 106 such that the prediction made at act 504 is more accurate.

In some embodiments, the process 500 can use an in-situ automated observation device, where, at act 518, an optimal travel path for an observation device can be determined and, at act 520, the observation device can be used to observe whether ice is present at given locations of the body of water. The optimal travel path may be adjusted to accurately define a border between ice cover and no-ice on the body of water.

In some embodiments, the trained model 202 can be trained with hindcasts performed by the hydrodynamics model 114. In other words, the output from the hydrodynamic model 114 can be used as feature values in the machine learning module 106, creating a link between the two modules 104, 106.

In some embodiments, the ice cover prediction engine 106 may be used for iceberg tracking. For example, the machine learning module 106 can be trained on possible iceberg tracks given local weather information (feature values) using satellite-derived tracks (target values). The predictions of the iceberg track can be obtained from combining a hydrodynamic model with the machine learning module in a manner similar to that described above.

Figure 6:
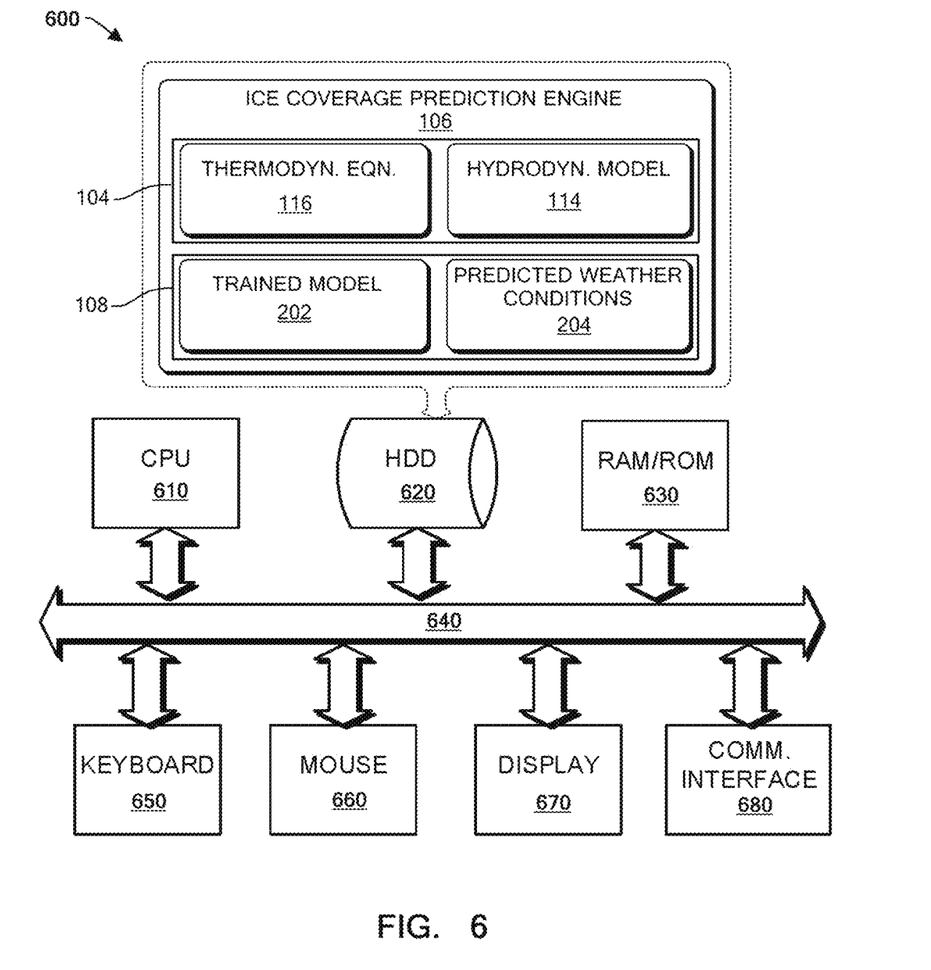
FIG. 6 is a functional block diagram illustration of a computer hardware platform that can be used to implement the ice coverage prediction engine of FIG. 2.

FIG. 6 provides a functional block diagram illustration of a computer hardware platform 600 that can be used to implement a particularly configured computing device that can host an ice cover prediction engine 106. The ice cover prediction engine 106, as discussed above, can include a thermodynamics module 104 and a machine learning module 108. The thermodynamics module 104 can include a hydrodynamic model 114 and thermodynamic equations 116, as discussed above. The machine learning module 108 can include a trained model 202 and predicted weather conditions 204, as discussed above. In particular, FIG. 6 illustrates a network or host computer platform 600, as may be used to implement an appropriately configured engine 106, as illustrated in FIG. 2.

The computer platform 600 may include a central processing unit (CPU) 610, a hard disk drive (HDD) 620, random access memory (RAM) and/or read only memory (ROM) 630, a keyboard 650, a mouse 660, a display 670, and a communication interface 680, which are connected to a system bus 640.

In one embodiment, the HDD 620, has capabilities that include storing a program that can execute various processes, such as ice cover prediction engine 106, in a manner described herein.

In one embodiment, the communication interface 680 can be configured to receive data from the satellite 110, the weather station 112, the observation device 120, or the like, as illustrated in FIG. 1.

CONCLUSION

The descriptions of the various embodiments of the present teachings have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to a flowchart illustration and/or block diagram of a method, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of an appropriately configured computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The call-flow, flowchart, and block diagrams in the figures herein illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:
1. A computer implemented method of predicting ice coverage on a body of water, comprising:
 generating a first ice cover prediction on a first map grid, with respect to the body of water, with a thermodynamics module;

generating a second ice cover prediction on a second map grid, with respect to the body of water, with a machine learning module;

combining the first ice cover prediction on the first map grid and the second ice cover prediction on the second map grid to generate a combined ice cover prediction on a combined map grid, with respect to the body of water;

computing error statistics based on a comparison of the combined ice cover prediction with an ice coverage observation;

updating the combined ice cover prediction on the combined map grid based on the error statistics; and updating a travel path of an automated observation device based on the combined ice cover prediction on the combined map grid.

2. The computer implemented method of claim 1, wherein the thermodynamics module includes a hydrodynamic model and one or more thermodynamic equations used to generate the first ice cover prediction.

3. The computer implemented method of claim 2, further comprising updating the hydrodynamic model based on the error statistics.

4. The computer implemented method of claim 1, wherein the machine learning module includes a trained model and a module for generating a predicted local weather condition.

5. The computer implemented method of claim 4, further comprising providing a feedback loop to the trained model based on the error statistics.

6. The computer implemented method of claim 1, further comprising applying weightings and thresholds to generate the combined ice coverage prediction from the first ice coverage prediction and the second ice coverage prediction.

7. The computer implemented method of claim 6, wherein the weightings and thresholds are applied to each grid cell defining a surface area of the body of water.

8. The computer implemented method of claim 6, wherein the weighting and thresholds for each grid cell are defined separately based on a predefined period throughout a year.

9. The computer implemented method of claim 6, wherein a tree-based model is used to optimize the combined ice coverage prediction.

10. The computer implemented method of claim 1, further comprising performing direct observations of ice coverage at the body of water with the observation device.

11. The computer implemented method of claim 10, wherein a travel path for the observation device is optimized based on the combined ice coverage prediction and observations of whether ice is present at a grid cell defining a surface area of the body of water.

12. The computer implemented method of claim 11, further comprising updating the travel path when disagreement occurs regarding ice coverage based on the combined ice coverage prediction and the observations of the observation device.

13. The computer implemented method of claim 10, wherein the observation device is an in-situ automated observation device.

14. A computer implemented method for predicting ice coverage on a body of water, comprising:

generating a first ice cover prediction on a first map grid, with respect to the body of water, with a thermodynamics module;

generating a second ice cover prediction on a second map grid, with respect to the body of water, with a machine learning module;

combining the first ice cover prediction on the first map grid and the second ice cover prediction on the second map grid to generate a combined ice cover prediction on the combined map grid based on an initial set of weightings and thresholds;

computing error statistics based on a comparison of the combined ice cover prediction with an ice coverage observation from an automated observation device;

updating the weightings and thresholds based on the error statistics;

using the updated weightings and thresholds to generate an updated combined ice cover prediction on the combined map grid; and updating a travel path of an automated observation device based on the combined ice cover prediction on the combined map grid.

15. The computer implemented method of claim 14, further comprising updating a travel path of the automated observation device when disagreement occurs regarding ice coverage based on the combined ice coverage prediction and the observations made of ice coverage with the automated observation device.

16. The computer implemented method of claim 14, wherein the weightings and thresholds are applied to each grid cell defining a surface area of the body of water.

17. The computer implemented method of claim 14, wherein the weighting and thresholds for each grid cell are defined separately based on a predefined period throughout a year.

18. The computer implemented method of claim 14, wherein a tree-based model is used to optimize the combined ice coverage prediction.

19. A non-transitory computer readable storage medium tangibly embodying a computer readable program code having computer readable instructions that, when executed, causes a computer device to carry out a method of predicting ice coverage on a body of water, the method comprising:

generating a first ice cover prediction on a first map grid, with respect to the body of water, with a thermodynamics module;

generating a second ice cover prediction on a second map grid, with respect to the body of water, with a machine learning module;

combining the first ice cover prediction on the first map grid and the second ice cover prediction on the second map grid to generate a combined ice cover prediction on a combined map grid, with respect to the body of water;

computing error statistics based on a comparison of the combined ice cover prediction with an ice coverage observation;

updating the combined ice cover prediction on the combined map grid based on the error statistics; and updating a travel path of an automated observation device based on the combined ice cover prediction on the combined map grid.

20. The non-transitory computer readable storage medium of claim 19, wherein the execution of the code by the processor further configures the computing device to perform an act comprising:

generating the combined ice coverage prediction by applying weightings and thresholds to the first ice coverage prediction and the second ice coverage prediction.

21. The non-transitory computer readable storage medium of claim 19, wherein the execution of the code by the processor further configures the computing device to perform an act comprising:
performing direct observations of ice coverage at the body of water, wherein automated observation device is an in-situ automated observation device.

22. A non-transitory computer readable storage medium tangibly embodying a computer readable program code having computer readable instructions that, when executed, causes a computer device to carry out a method of predicting ice coverage on a body of water, the method comprising:
generating a first ice cover prediction on a first map grid, with respect to the body of water, with a thermodynamics module;
generating a second ice cover prediction on a second map grid, with respect to the body of water, with a machine learning module;
combining the first ice cover prediction on the first map grid and the second ice cover prediction on the second map grid to generate a combined ice cover prediction on a combined map grid, with respect to the body of water, based on an initial set of weightings and thresholds;
computing error statistics based on a comparison of the combined ice cover prediction with an ice coverage observation from an automated observation device;
updating the weightings and thresholds based on the error statistics;
using the updated weightings and thresholds to generate an updated combined ice cover prediction on the combined map grid; and
updating a travel path of the automated observation device based on the combined ice cover prediction on the combined map grid.

23. The non-transitory computer readable storage medium of claim 22, wherein the execution of the code by the processor further configures the computing device to perform an act comprising:
updating a travel path of the automated observation device when disagreement occurs regarding ice coverage based on the combined ice coverage prediction and the observations made of ice coverage with the automated observation device.

24. The non-transitory computer readable storage medium of claim 22, wherein the weightings and thresholds are applied to each grid cell defining a surface area of the body of water.

25. The non-transitory computer readable storage medium of claim 24, wherein the weighting and thresholds for each grid cell are defined separately based on a predefined period throughout a year.

* * * * *